(12) United States Patent
Ikizyan et al.

(10) Patent No.: US 9,185,338 B2
(45) Date of Patent: *Nov. 10, 2015

(54) SYSTEM AND METHOD FOR FINGERPRINTING VIDEO

(71) Applicant: Broadcom Corporation, Irvine, CA (US)

(72) Inventors: Ike Ikizyan, Newport Coast, CA (US); Marcus Kellerman, Poway, CA (US)

(73) Assignee: BROADCOM CORPORATION, Irvine, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/968,616

(22) Filed: Aug. 16, 2013

(65) Prior Publication Data

US 2013/0330057 A1 Dec. 12, 2013

Related U.S. Application Data

(63) Continuation of application No. 13/334,201, filed on Dec. 22, 2011, now Pat. No. 8,538,239.

(51) Int. Cl.
*H04N 5/92* (2006.01)
*H04N 5/93* (2006.01)
*G06K 9/00* (2006.01)

(52) U.S. Cl.
CPC .............. *H04N 5/92* (2013.01); *G06K 9/00751* (2013.01); *G06K 9/00765* (2013.01)

(58) Field of Classification Search
CPC . G06K 9/00751; G06K 9/00765; H04N 5/92; H04N 5/783
USPC .......... 386/241, 248, 223, 224, 239, 326, 341
See application file for complete search history.

(56) References Cited

U.S. PATENT DOCUMENTS

| 8,538,239 B2* | 9/2013 | Ikizyan et al. ................. 386/241 |
| 2009/0167942 A1 | 7/2009 | Hoogenstraaten et al. |
| 2009/0328237 A1 | 12/2009 | Rodriguez et al. |
| 2013/0163957 A1 | 6/2013 | Ikizyan et al. |

FOREIGN PATENT DOCUMENTS

| CN | 102098508 | 6/2011 |
| KR | 10 2009 0019830 | 2/2009 |
| WO | 2006/059053 A1 | 6/2006 |
| WO | 2007/144813 A2 | 12/2007 |

OTHER PUBLICATIONS

Lu, Jian, "Video Fingerprinting for Copy Identification: From Research to Industry Applications.", Proceedings of SPIE, Us, vol. 7254, Jan. 19, 2009, pp. 725402-1 to 725402-15, XP008127837.
Joly, et al., "Robus Content-Based Video Copu Idnetification in a Large Refernece Database," Lecture Notes in Computer Science/ Computational Science (Eurocrypt) Ches 20-02, Springer, DE, vol. 2728, Jan. 1, 2003, pp. 414-424, SP002366449.
European Search Report in co-pending, related EP Application No. 12 00 5902, mailed Aug. 27, 2013.
Korean Office Action in co-pending, related KR Application No. 10-2012-0105197 mailed Oct. 24, 2013.
Office Action for Taiwan Patent Application No. 101132784 mailed Jun. 15, 2015 (including English summary).
Office Action for Chinese Patent Application No. 2012103713637, mailed Aug. 3, 2015 (including English summary).

* cited by examiner

*Primary Examiner* — Robert Chevalier
(74) *Attorney, Agent, or Firm* — Foley & Lardner LLP; Christopher J. McKenna; Daniel E. Rose

(57) ABSTRACT

Disclosed are various embodiments of generating video fingerprints. Scene changes can be detected in a video and a video fingerprint generated based upon a time at which the scene change occurs as well as time intervals between the scene changes relative to adjacent scene changes. A video can be captured and analyzed by comparing scene changes detected in the video to those described by the video fingerprint.

20 Claims, 14 Drawing Sheets

203

Video Fingerprint 201

Video ID - 03341234

| Scene Start | Interval 1 | Interval 2 |
|---|---|---|
| $s_1$ | $\Delta t_1$ | $\Delta t_2$ |
| $s_1$ | $\Delta t_1$ | $\Delta t_2 + \Delta t_3$ |
| $s_1$ | $\Delta t_1 + \Delta t_2$ | $\Delta t_3$ |
| $s_2$ | $\Delta t_2$ | $\Delta t_3$ |
| $s_2$ | $\Delta t_2$ | $\Delta t_3 + \Delta t_4$ |
| $s_2$ | $\Delta t_2 + \Delta t_3$ | $\Delta t_4$ |
| $s_3$ | $\Delta t_3$ | $\Delta t_4$ |
| $s_3$ | $\Delta t_3$ | $\Delta t_4 + \Delta t_5$ |
| $s_3$ | $\Delta t_3 + \Delta t_4$ | $\Delta t_5$ |
| $s_4$ | $\Delta t_4$ | $\Delta t_5$ |
| $s_4$ | $\Delta t_4$ | $\Delta t_5 + \Delta t_6$ |
| $s_4$ | $\Delta t_4 + \Delta t_5$ | $\Delta t_6$ |

| Scene Start | Interval 1 | Interval 2 |
|---|---|---|
| $s'_1$ | $\Delta t_1$ | $\Delta t_2$ |
| $s'_1$ | $\Delta t_1$ | $\Delta t_2 + \Delta t_3$ |
| $s'_1$ | $\Delta t_1 + \Delta t_2$ | $\Delta t_3$ |
| $s'_2$ | $\Delta t_2$ | $\Delta t_3$ |
| $s'_2$ | $\Delta t_2$ | $\Delta t_3 + \Delta t_4$ |
| $s'_2$ | $\Delta t_2 + \Delta t_3$ | $\Delta t_4$ |
| $s'_3$ | $\Delta t_3$ | $\Delta t_4$ |
| $s'_3$ | $\Delta t_3$ | $\Delta t_4 + \Delta t_5$ |
| $s'_3$ | $\Delta t_3 + \Delta t_4$ | $\Delta t_5$ |
| $s'_4$ | $\Delta t_4$ | $\Delta t_5$ |
| $s'_4$ | $\Delta t_4$ | $\Delta t_5 + \Delta t_6$ |
| $s'_4$ | $\Delta t_4 + \Delta t_5$ | $\Delta t_6$ |

| Scene Start | Interval 1 | Interval 2 |
|---|---|---|
| $s'_1$ | $\Delta t_1$ | $\Delta x_2$ |
| $s'_1$ | $\Delta t_1$ | $\Delta x_2 + \Delta t_4$ |
| $s'_1$ | $\Delta t_1 + \Delta x_2$ | $\Delta t_4$ |
| $s'_2$ | $\Delta x_2$ | $\Delta t_4$ |
| $s'_2$ | $\Delta x_2$ | $\Delta t_4 + \Delta t_5$ |
| $s'_2$ | $\Delta x_2 + \Delta t_4$ | $\Delta t_5$ |
| $s'_4$ | $\Delta t_4$ | $\Delta t_5$ |
| $s'_4$ | $\Delta t_4$ | $\Delta t_5 + \Delta t_6$ |
| $s'_4$ | $\Delta t_4 + \Delta t_5$ | $\Delta t_6$ |

| Scene Start | Interval 1 | Interval 2 |
|---|---|---|
| $s'_1$ | $\Delta t_1$ | $\Delta x_2$ |
| $s'_1$ | $\Delta t_1$ | $\Delta x_2 + \Delta t_4$ |
| $s'_1$ | $\Delta t_1 + \Delta x_2$ | $\Delta t_4$ |
| $s'_2$ | $\Delta x_2$ | $\Delta t_4$ |
| $s'_2$ | $\Delta x_2$ | $\Delta t_4 + \Delta t_5$ |
| $s'_2$ | $\Delta x_2 + \Delta t_4$ | $\Delta t_5$ |
| $s'_4$ | $\Delta t_4$ | $\Delta t_5$ |
| $s'_4$ | $\Delta t_4$ | $\Delta t_5 + \Delta t_6$ |
| $s'_4$ | $\Delta t_4 + \Delta t_5$ | $\Delta t_6$ |

| Scene Start | Interval 1 | Interval 2 |
|---|---|---|
| $s'_1$ | $\Delta t_1$ | $\Delta y_2$ |
| $s'_1$ | $\Delta t_1$ | $\Delta y_2 + \Delta y_3$ |
| $s'_1$ | $\Delta t_1 + \Delta y_2$ | $\Delta y_3$ |
| $s'_2$ | $\Delta y_2$ | $\Delta y_3$ |
| $s'_2$ | $\Delta y_2$ | $\Delta y_3 + \Delta t_3$ |
| $s'_2$ | $\Delta y_2 + \Delta y_3$ | $\Delta t_3$ |
| $f_1$ | $\Delta y_3$ | $\Delta t_3$ |
| $f_1$ | $\Delta y_3$ | $\Delta t_3 + \Delta t_4$ |
| $f_1$ | $\Delta y_3 + \Delta t_3$ | $\Delta t_4$ |
| $s'_3$ | $\Delta t_3$ | $\Delta t_4$ |
| $s'_3$ | $\Delta t_3$ | $\Delta t_4 + \Delta t_5$ |
| $s'_3$ | $\Delta t_3 + \Delta t_4$ | $\Delta t_5$ |

| Scene Start | Interval 1 | Interval 2 |
|---|---|---|
| $s'_1$ | $\Delta t_1$ | $\Delta y_2$ |
| $s'_1$ | $\Delta t_1$ | $\Delta y_2 + \Delta y_3$ |
| $s'_1$ | $\Delta t_1 + \Delta y_2$ | $\Delta y_3$ |
| $s'_2$ | $\Delta y_2$ | $\Delta y_3$ |
| $s'_2$ | $\Delta y_2$ | $\Delta y_3 + \Delta t_3$ |
| $s'_2$ | $\Delta y_2 + \Delta y_3$ | $\Delta t_3$ |
| $f_1$ | $\Delta y_3$ | $\Delta t_3$ |
| $f_1$ | $\Delta y_3$ | $\Delta t_3 + \Delta t_4$ |
| $f_1$ | $\Delta y_3 + \Delta t_3$ | $\Delta t_4$ |
| $s'_3$ | $\Delta t_3$ | $\Delta t_4$ |
| $s'_3$ | $\Delta t_3$ | $\Delta t_4 + \Delta t_5$ |
| $s'_3$ | $\Delta t_3 + \Delta t_4$ | $\Delta t_5$ |

SYSTEM AND METHOD FOR FINGERPRINTING VIDEO

CROSS-REFERENCE TO RELATED APPLICATIONS/INCORPORATION BY REFERENCE

This application is a continuation of U.S. application Ser. No. 13/334,201 entitled "SYSTEM AND METHOD FOR FINGERPRINTING VIDEO" and filed on Dec. 22, 2011, which is hereby incorporated herein by reference in its entirety.

BACKGROUND

Video fingerprinting is useful for various purposes. A video fingerprint refers to a way in which a video can be uniquely identified relative to other videos in a collection or corpus of many videos. Video fingerprinting systems and methods in the art often lack robustness in the sense that they fail to identify clips, edited versions, and/or even full versions of a video that have been compressed or fail to comprise a bitwise match of a reference video. Prior art video fingerprinting systems and methods may also fail to match a video under analysis to a reference video if the video quality has been degraded or otherwise altered.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a drawing of a portion of a video fingerprint corresponding to the video of FIG. 1 according to various embodiments of the disclosure.

FIG. 3A-3I are drawings illustrating matching of a video profile to the video fingerprint of FIG. 2 according to various embodiments of the disclosure.

DETAILED DESCRIPTION

Embodiments of the disclosure are generally related to generating a fingerprint associated with a video as well as identifying a video by comparing a fingerprint associated with the video to a reference fingerprint. Video fingerprinting is a general technique to identify and extract characteristic features of a video, enabling the video to be uniquely identified by its resulting fingerprint. A video fingerprint generated according to embodiments of the disclosure is highly compressed compared to video itself, meaning it generally consumes much less data than the video to which it corresponds. As will be described below, the video fingerprinting method disclosed herein is a symmetric process, meaning the process of identifying a reference fingerprint associated with a video is a similar process as that of generating the video fingerprint itself.

In the context of the present disclosure, systems implementing the video fingerprinting process described herein can be employed to facilitate identifying an unknown video or video clip, retrieving metadata associated with a video from a database (e.g., title, genre, name of director, year filmed, names of actors, etc.), classifying or identifying a video for the purposes of digital rights management (DRM), tracking the distribution of unauthorized or illegal content, video search engines, content aware advertising, identifying a user's viewing choices and/or habits for sharing with others, identifying duplicate video clips in a large database, synchronized retrieval of closed caption data, and/or other applications as can be appreciated.

Figure 1:
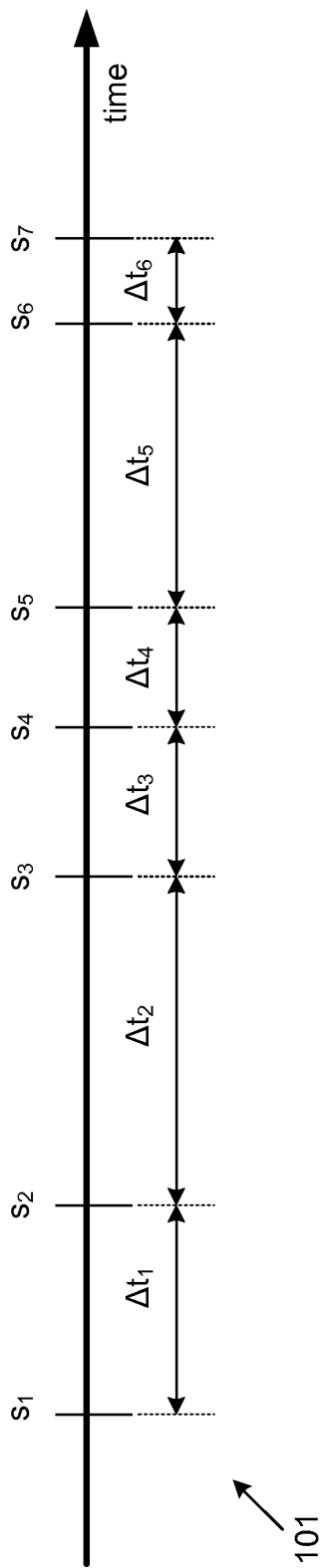
FIG. 1 is a drawing of a video timeline for which a video fingerprint can be generated according to various embodiments of the disclosure.

Accordingly, reference is now made to FIG. 1, which illustrates a representation of a video to illustrate the theory of operation of the video fingerprinting technique according to an embodiment of the disclosure. The depicted embodiment illustrates a portion of a video 101 represented over time.

The video fingerprinting technique disclosed herein involves detection of scene changes that occur in a video. As shown in FIG. 1, the scene changes, ($s_1$, $s_2$, $s_3$, $s_4$, $s_5$, $s_6$, $s_7$, etc.) occur at various points in time in the video. Scene changes in a video source can be detected using various systems and methods known in the art. Accordingly, in order to generate a video fingerprint according to an embodiment of the disclosure, the various scene changes in a video can be detected as well as a time (e.g., relative to a starting point in the video) in the video at which each of the scene changes occur. Additionally, the time difference (e.g., an amount of time, number of frames, etc.) between successive scene changes is also detected. These time differences are represented in FIG. 1 in the non-limiting example of a video by $\Delta t_1$, $\Delta t_2$, $\Delta t_3$, $\Delta t_4$, $\Delta t_5$, and $\Delta t_6$. Accordingly, a video fingerprint associated with the video 101 is based upon at least two pieces of information, which include a time in the video associated with each of the scene changes as well as a time difference between successive scene changes.

Reference is now made to FIG. 2, which illustrates one representation of a video fingerprint 201 associated with a video according to an embodiment of the disclosure. It should be appreciated that the depicted video fingerprint 201 is but one example of a video fingerprint and that other representations embodying the same or similar data can be employed consistent with this disclosure. In the depicted example, the video fingerprint 201 can represent a reference fingerprint of a video. Accordingly, the video fingerprint 201 can be associated with a video identifier 203 that uniquely identifies a video with which the fingerprint 201 is associated. Any other identifying information associated with a video can also be associated with the identifier 203 and/or the fingerprint 201 that can be provided in various applications. For example, as noted above, various metadata can also be associated with the video, which can be stored in the same or a different database that can be indexed by the video identifier 203 and/or the fingerprint 201.

The video fingerprint 201 can include a representation of a table that comprises at least three types of data. A scene start time of at least a subset of the scene changes in the video can be associated with at least two time differences between scene changes that are subsequent to the particular scene change. In other words, the fingerprint 201 associates a scene change with a pairing of time intervals between the next two successive scene changes as shown. Accordingly, in the depicted example, the first entry in the table of the video fingerprint 201 associates a scene change start time $s_1$ with $\Delta t_1$ and $\Delta t_2$, which represent a time difference between the scene change occurring at time $s_1$ in the video and the next two scene changes in the video, $S_2$ and $S_3$.

The fingerprint 201 also associates a particular scene change with additional time difference or interval pairings that represent potential missed scene change detections. In the second entry in the depicted example fingerprint 201, the scene change start time $s_1$ is also associated with a time difference pairing of $\Delta t_1$ and $\Delta t_2 + \Delta t_3$, which represents a pairing of time intervals to the next two successive scene changes if detection of scene change $s_3$ is missed. In other words, this pairing of time intervals represents the time interval to scene changes $s_2$ and $s_4$, which accounts for the possibility that the scene change at $s_2$ is missed. Similarly, in the third entry in the depicted example fingerprint 201, the scene change start time $s_1$ is also associated a time difference pairing of $\Delta t_1 + \Delta t_2$ and $\Delta t_3$, which represents a pairing of time intervals to next two successive scene changes if detection of scene change $s_2$ is missed. Additionally, the video fingerprint 201 table can include similar entries for successive scene changes.

Accordingly, to process a video and attempt to identify a reference video fingerprint such as one in the depicted example of FIG. 2, a computing device can generate a table by detecting scene changes in the video and measuring a scene change start time as well as time intervals to the next two successive scene change for each detected scene change. The computing device can then attempt to match the generated table with a reference video fingerprint 201, which can be stored in a database or other data store.

FIG. 3A illustrates an example. The table shown in FIG. 3A illustrates an example of a table 301 representing a video profile that is generated in response to process a video in an attempt to identify a video fingerprint 201 with which the video matches. FIG. 3A illustrates a case where detection of a scene change is not missed, nor are there any false positive scene change detections. Accordingly, a computing device implementing a process whereby it attempts to match a video with a reference video fingerprint can compare the entries in the table generated by processing the video with various reference video fingerprints 201 until a match is found. In the depicted example, the reference video fingerprint 201 can be located by matching the time interval pairings in the table 301.

The video fingerprinting process as well as the process of matching a video profile to a reference video fingerprint 201 can be conducted on any portion of the video 101. For example, a video profile representing a clip of a reference video can be generated and compared to the reference video fingerprint 201 to determine whether a match exists. To illustrate, a video profile for a clip representing a few minutes from any portion of a reference video can be generated and matched according to the time at which scene changes occur and the intervals between them. Additionally, the first scene change in a video profile may not necessarily correspond to the first scene change in a reference video signature 201, but instead may correspond to a scene change that occurs after many previous scene changes in the reference video.

Figure 3B:
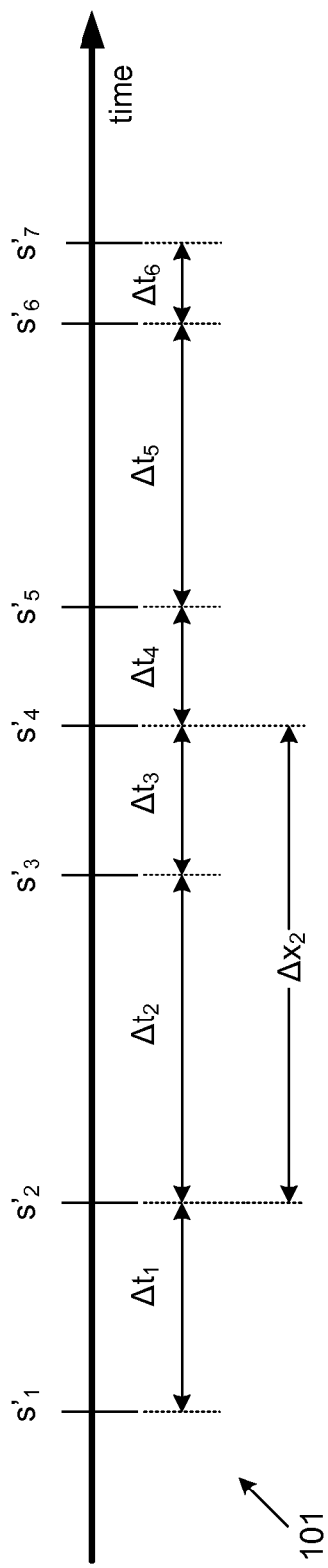

In the depicted example of a video profile represented by the table 301 of FIG. 3A, it is shown that similar to the reference video fingerprint 201, the table 301 also includes the detected scene start times of the scene changes in the video being associated with at least two time differences between scene changes that are subsequent to the particular scene change. In other words, the table 301 representing a video profile also associates a scene change with a pairing of time intervals between the next two successive scene changes as shown. In this way, even if a device generating a video profile correctly detects each and every scene change in a video under analysis, a match can be found with a reference video fingerprint 201 even in the event that the reference video fingerprint 201 may lack entries for certain scene changes (i.e., the reference video fingerprint 201 "missed" a scene change). The video profile can also allow a match to be found against a reference video fingerprint 201 that includes false positive scene change entries. In other words, the process of generating a video fingerprint 201 as well as generating a video profile that is used to match against a video fingerprint 201 are symmetric with respect to one another to account for potential errors in the reference video fingerprint 201 and/or the video profile. This is illustrated in further detail in FIGS. 3B-3I and discussed hereinbelow.

Additionally, the scene start time in each entry of the table 301 can increase the confidence of a match. Scene start times are measured relative to the time when video analysis is initiated. In other words, a scene start time of a video under analysis may not represent an absolute scene start time, but a time in a video clip at which a scene change occurs relative to the beginning of a video clip, which can differ from the scene start time in a reference video as measured from the beginning of the reference video.

Accordingly, the scene start time values are not meant to be treated in an absolute sense. Relative differences between the start times of corresponding interval pairings are meaningful. For example, a difference between $s'_1$ in the table 301 and $s_1$ in the reference video signature 201 can be compared to a difference between $s'_2$ in the table 301 and $s_2$ in the reference video signature 201 to determine if this difference is consistent. Therefore, a marked consistency in the relative scene start time differences between entries in the table 301 relative to the reference fingerprint 201 may increase a confidence score associated with a match. In the depicted example, a confidence score of a match between the example video fingerprint 201 shown in FIG. 2 and a video profile represented by the table 301 can be increased due to the similarity of time differences between each of the scene start times.

In some embodiments, a confidence score can be generated that corresponds to a likelihood of a match between a table 301 and a reference video fingerprint 201. It should be appreciated that scene change detection, whether tracked in terms of a frame number and/or running time in a video, may not result in an exact match between entries in a table 301 and a reference video fingerprint 201. Accordingly, such a confidence score can be based at least upon an amount error or difference between entries in a table 301 and video fingerprint 201. In some embodiments, a reference video fingerprint 201 that yields the smallest error and/or difference between entries in the table 301 and fingerprint 201 can be identified as a match.

Reference is now made to FIGS. 3B and 3C, which illustrate a video profile corresponding to the video 101 shown in FIG. 1. In the example of FIG. 3B, a computing device generating a video profile corresponding to the video 101 has missed a scene change occurring at time $s'_3$ in the video. In this example, despite the fact that a scene change detection is missed by a computing device generating the table 351, the reference video fingerprint 201 can still be matched with the video profile corresponding to the table 351 because the reference video fingerprint 201 contains entries that take into account potential missed scene change detections. Accordingly, as shown in FIG. 3C, the table 351 represents a video profile generated in an attempt to identify a video fingerprint 201 with which the video matches. Because the scene change occurring at time $s'_3$ in the video was missed, the table 351 does not include an entry corresponding to a scene starting at time $s'_3$. The reference video fingerprint 201 can still be matched with the table 351 shown in FIG. 3C despite the fact that the scene change was missed because of the entries taking into account potential missed detection of scene changes.

Figure 3D:
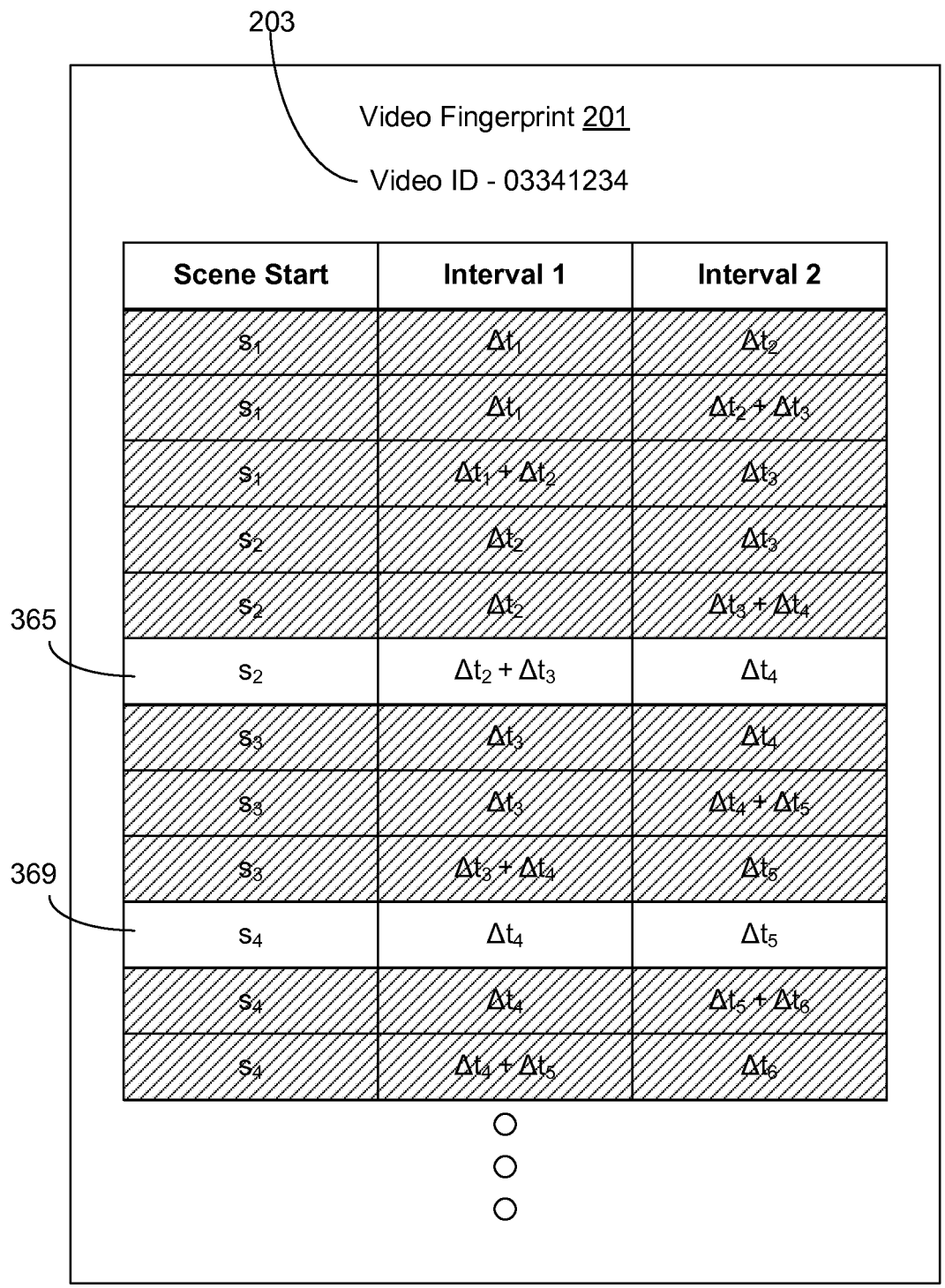

To illustrate, FIGS. 3D and 3E show the matching entries in the reference video fingerprint 201 and the table 351 corresponding to the video profile. Entry 365 in the reference video fingerprint 201 constitutes a match with entry 375 in the table 351. Additionally, entry 369 in the reference video fingerprint 201 constitutes a match with entry 379 in the table 351, and so on. Accordingly, despite the fact that detection of scene change $s_3$ was missed, the profile corresponding to the table 351 can still be matched with the reference video fingerprint 201.

Figure 3F:
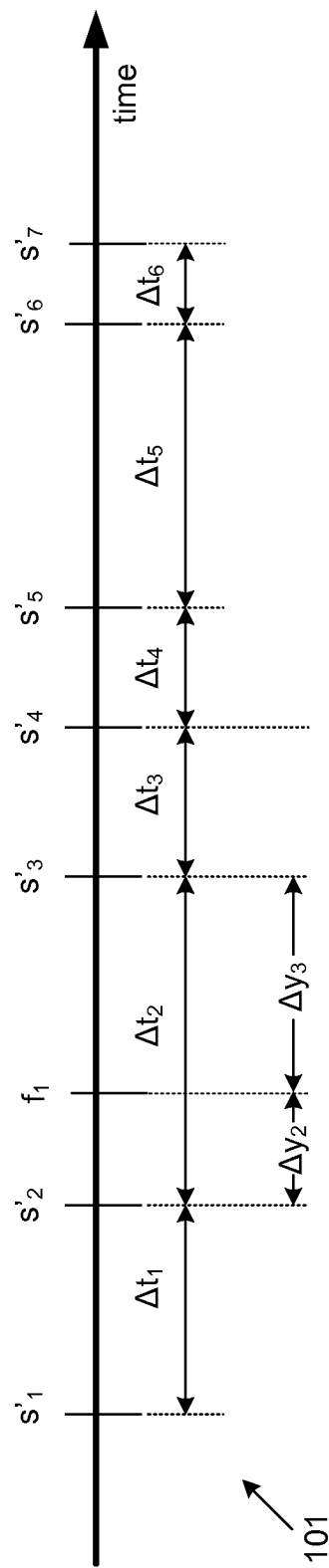

Reference is now made to FIGS. 3F and 3G, which illustrate an alternative example of a video profile corresponding to the video 101 shown in FIG. 1. In the example of FIG. 3F, a computing device generating a video profile corresponding to the video 101 has detected a false positive scene change. In other words, a scene change has been detected at a time within the video where the reference video fingerprint does not reflect a corresponding scene change. In FIG. 3F, this false positive scene change is denoted by $f_1$. In the example of FIG. 3F, because a false positive scene change was detected at time $f_1$, the table 381 corresponding to the video profile associated with the video 101 includes an additional series of entries corresponding to the false positive scene change $f_1$ that are not included within the reference video fingerprint 201. In some situations, the video profile may correctly reflect the scene changes while the reference video fingerprint 201 contains a missed scene change, which would result in a similar situation. However, due to the symmetric nature of the algorithm described herein, the video profile corresponding to the table 381 can still be matched to the corresponding reference video fingerprint 201.

Figure 3H:
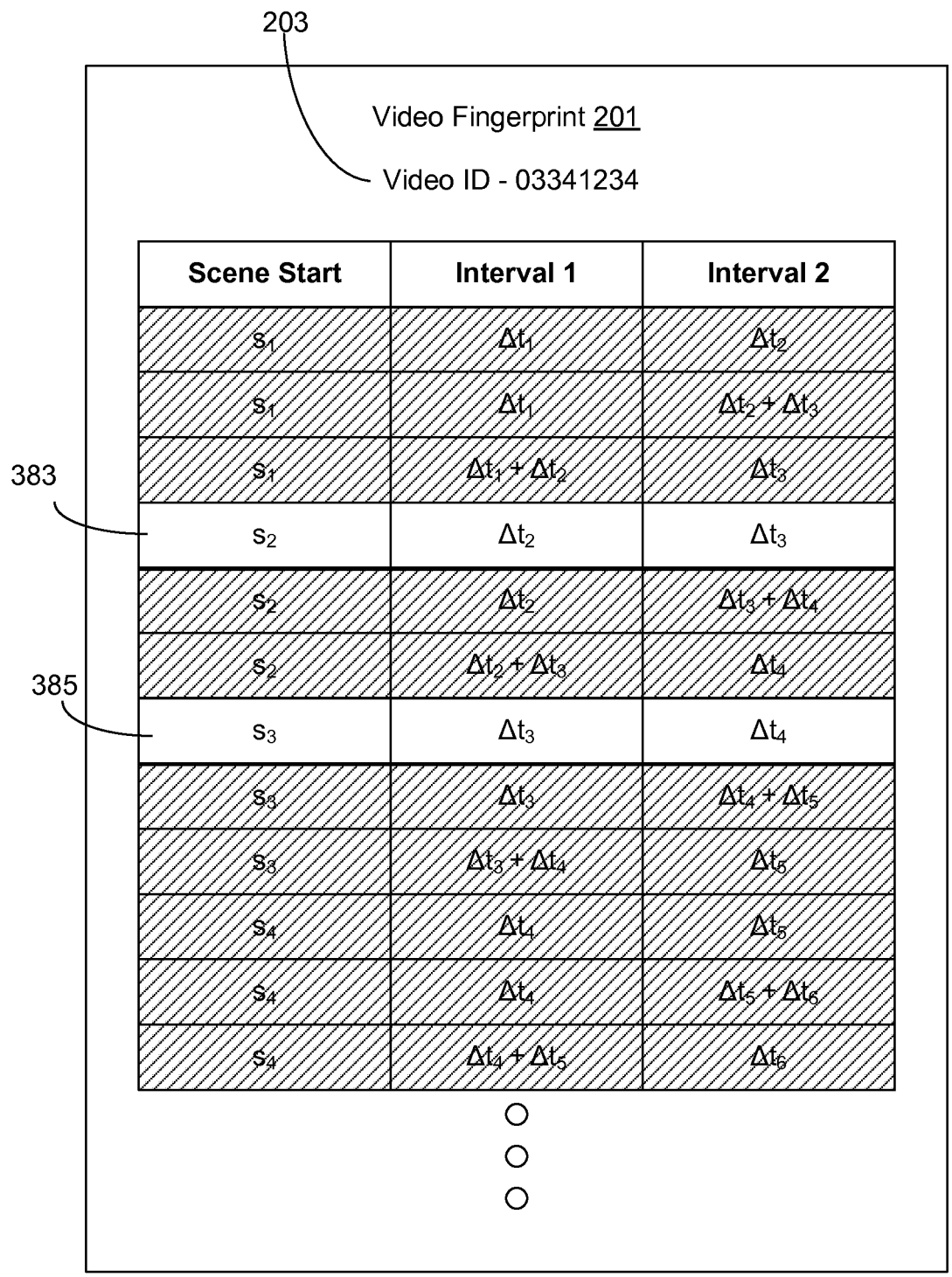

To illustrate, FIGS. 3H and 3I show the matching entries in the reference video fingerprint 201 and table 381 corresponding to the video profile. Entry 383 in the reference video fingerprint 201 constitutes a match with entry 391 in the table 381. Additionally, entry 385 in the reference video fingerprint 201 constitutes a match with entry 393 in the table 381, and so on. Accordingly, despite the fact that a false positive scene change $f_1$ was detected, the profile corresponding to the table 381 can still be matched with the reference video fingerprint 201. Additionally, it should be appreciated that a video profile that may include various combinations of false positives and/or missed scene change detections can be matched with a reference video fingerprint 201 by employing the process described herein.

Additionally, while the process described above can account for potential missed scene detections either in a reference video and/or video under analysis, the error robustness can be improved by extending the video fingerprint to associate more than two time intervals and the associated permutations of additional intervals to account for missed scene change detections. In other words, rather than limiting the video fingerprint to a pairing of time intervals associated with the next two scene changes, the video fingerprint can be extended to associate a scene change with the next three, four, or any number of subsequent scene changes. In such a scenario, each scene change in the video fingerprint would be associated with the time interval to the next X scene changes, where X is any positive integer. The scene change would also be associated with the time intervals associated with the various permutations of potential missed scene change detections consistent with the example described above in FIG. 2.

Therefore, embodiments employing the video fingerprint and matching processes consistent with the above can result in computationally efficient fingerprint generation and matching with compact video fingerprints for efficient transmission and storage. Additionally, systems and methods employing such a scheme can be capable of identifying a short segment or clip of a reference video. By relying on detection of scene changes as well as a time interval between subsequent scene changes, the process is also noise resistant and can account for encoding differences between a reference video and video under analysis. Encoding differences can result due to transcoding, video being captured via a video camera (e.g., mobile device, smartphone, tablet computing system, laptop computer), misaligned framing, camera shake, and/or variations in frame rate between a reference video and video under analysis. The process is also resistant to differences in picture quality between a reference video and video under analysis. Such picture quality characteristics can include, but are not limited to, sharpness, contrast, brightness, hue, saturation, scaling, etc.

Figure 4:
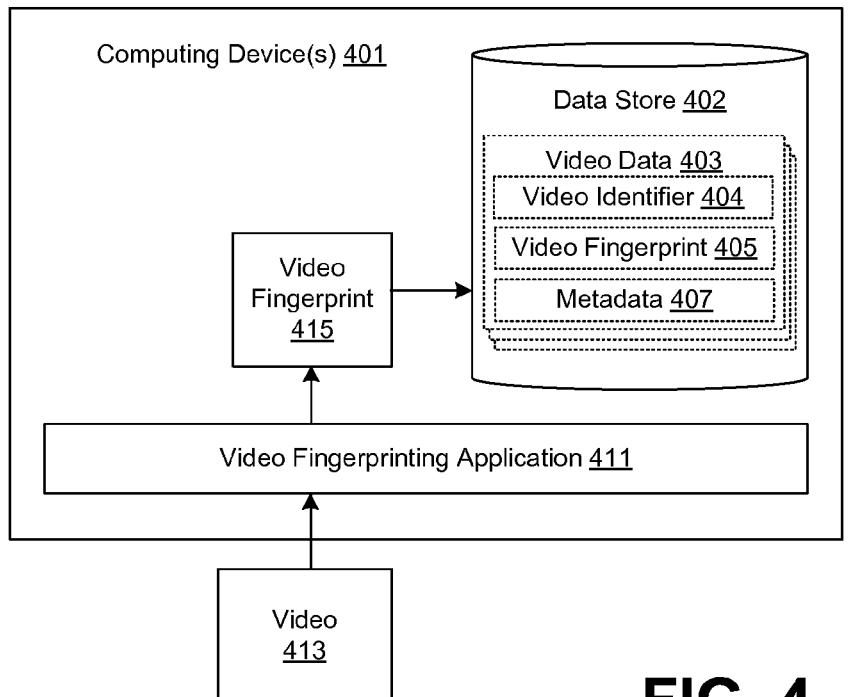
FIGS. 4-5 are drawings of a computing environment in which a video fingerprinting application can be executed according to various embodiments of the disclosure.

Reference is now made to FIG. 4, which illustrates an embodiment of at least one computing device 401 in which an embodiment of the disclosure can be implemented. The depicted configuration of a computing device 401 can be one in which a video fingerprint corresponding to a video is generated according to the methodology described above. The computing device 401 may comprise, for example, a server computer or any other system providing computing capability. Alternatively, a plurality of computing devices 401 may be employed that are arranged, for example, in one or more server banks or computer banks or other arrangements. For example, a plurality of computing devices 401 together may comprise a cloud computing resource, a grid computing resource, and/or any other distributed computing arrangement. Such computing devices 401 may be located in a single installation or may be distributed among many different geographical locations.

For purposes of convenience, the computing device 401 is referred to herein in the singular. Even though the computing device is referred to in the singular, it is understood that a plurality of computing devices 401 may be employed in the various arrangements as described above. The computing device 401 may comprise, for example, a processor-based system such as a computer system. Such a computer system may be embodied in the form of a desktop computer, a laptop computer, a personal digital assistant, a cellular telephone, set-top box, music players, mobile computing device, tablet computer systems, game consoles, or other devices with like capability.

The data stored in the data store 402 includes, for example, video data 403 associated with various videos for which video fingerprints 405 as well as metadata 407 can be associated, as well as potentially other data about videos indexed by a system according to an embodiment of the disclosure. An entry corresponding to a particular video can be indexed by a video identifier 404 that uniquely identifies the video. It should be appreciated that the data store 402 can represent a relational or non-relational database or other data storage system that can also be executed in a dedicated computing system that is accessible to the computing device 401 via a network.

In the example of FIG. 4, the computing device 401 can execute a video fingerprinting application 411, which can receive a video 413 as an input and generate a video fingerprint 415 as described above. In other words, the video fingerprinting application 411 can generate a reference video fingerprint 405 associated with the video 413. In this sense, the video 413 can be indexed by its video fingerprint 405 and/or a video identifier 404 based upon a video fingerprint 415 generated by the video fingerprinting application 411 that is based upon detected scene changes within the video as well as time intervals between the various scene changes. In some embodiments, the video fingerprinting application 411 can contain logic that facilitates identification of scene changes within a video 413. In other embodiments, the video fingerprinting application 411 can rely on scene change logic provided by an application programming interface that accesses external software and/or hardware logic that facilitates scene change detection.

Figure 5:
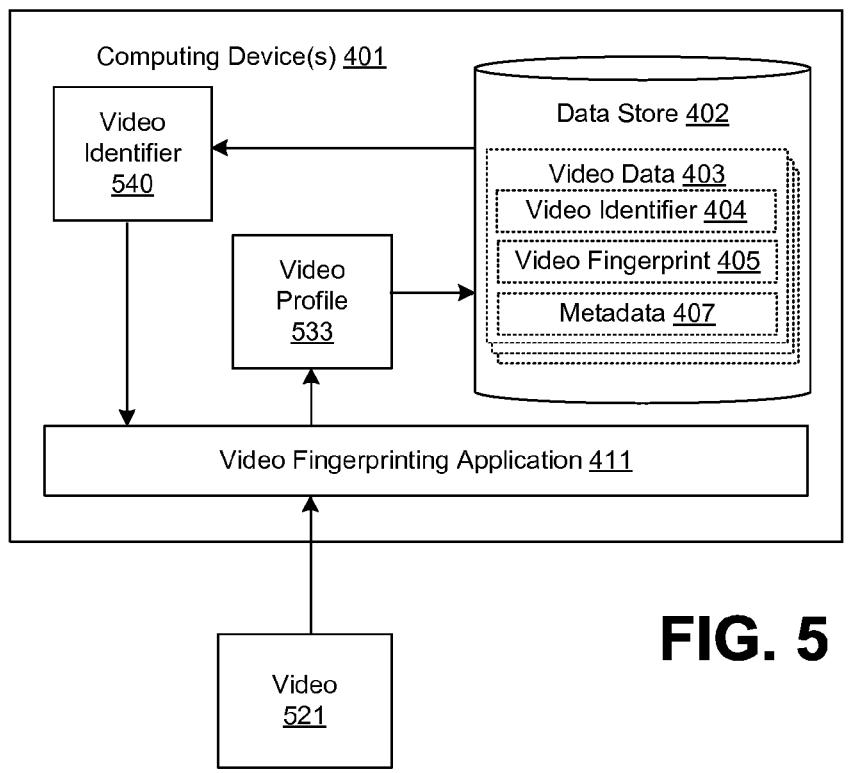

Accordingly, in FIG. 5, an alternative depiction of a computing device 401 executing the video fingerprinting application 411 is shown. In the example of FIG. 5, the video fingerprinting application 411 can receive a video 521 and generate a video profile 533 as described above in reference to FIGS. 3A-3B. In other words, the video fingerprinting application 411 can identify scene changes as well as intervals between scene changes in the video 521 to generate the video profile 533. Accordingly, the video fingerprinting application 411 can determine whether a video corresponding to video data 403 in the data store 402 matches the video profile 533 and return a video identifier 540 for the corresponding video.

It should be appreciated that in some embodiments, a video profile 533 can be generated by a client device that is viewing and/or capturing a video 521, with at least a portion of the video profile 533 generated by a client device submitting a request to the video fingerprinting application 411 to find a matching video. For example, a client device, such as a mobile device that is capturing a video for which it desires a matching video to be located, can provide a partial video profile that includes a list of times in the video 521 at which scene changes are detected. Accordingly, the video fingerprinting application 411 can determine time intervals between successive scene changes corresponding to each identified scene change as described with reference to FIGS. 3A-3B. The video fingerprinting application 411 can then identify a matching video in the data store by identifying a video fingerprint 405 that matches the video profile 533 with the highest degree of confidence.

Figure 6:
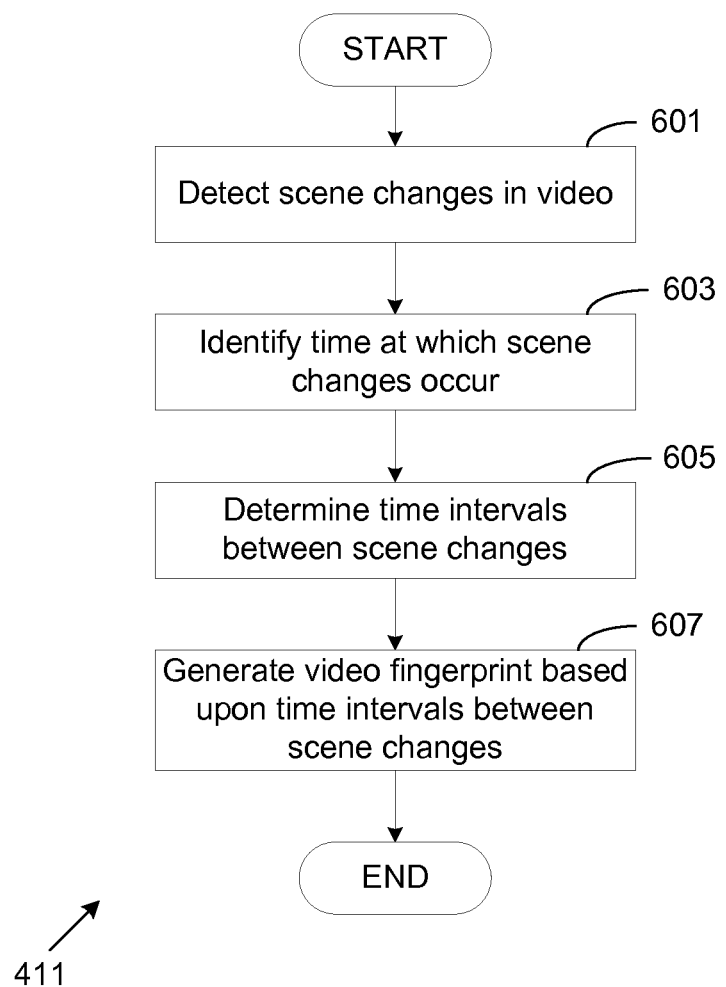
FIGS. 6-7 are flowcharts illustrating one example of functionality implemented as portions of video fingerprinting application executed in a computing device of FIGS. 4-5 according to various embodiments of the present disclosure.

Referring next to FIG. 6, shown is a flowchart that provides one example of the operation of a portion of the video fingerprinting application 411 to generate a video fingerprint according to various embodiments. It is understood that the flowchart of FIG. 6 provides merely an example of the many different types of functional arrangements that may be employed to implement the operation of the portion of the video fingerprinting application 411 as described herein. As an alternative, the flowchart of FIG. 6 may be viewed as depicting an example of steps of a method implemented in the computing device 401 according to one or more embodiments.

In one embodiment, to generate a reference video fingerprint corresponding to a video, in box 601 a plurality of scene changes are detected within the video. As noted above, scene changes can be detected using a scene change detection API that provides access to hardware and/or software logic facilitating scene change detection. In box 603, the time at which scene changes occur in the video are detected. In box 605, the video fingerprinting application 411 can detect a time interval between adjacent scene changes in the video. Finally, in box 607, the video fingerprinting application 411 can generate a video fingerprint based upon the time at which scene changes occur and a time interval between adjacent scene changes where the fingerprint also takes into account the potential for missed or false positive detection of scene changes as described above.

Figure 7:
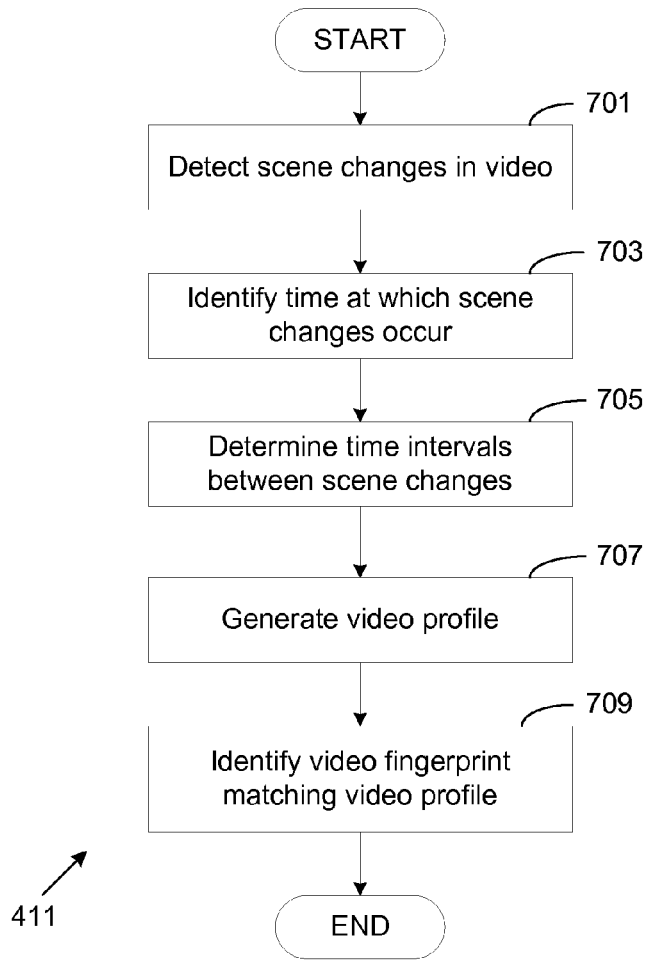

Referring next to FIG. 7, shown is a flowchart that provides one example of the operation of a portion of the video fingerprinting application 411 to identify a reference video fingerprint with which a video profile is matched in a database or other repository of video fingerprint data according to various embodiments. It is understood that the flowchart of FIG. 7 provides merely an example of the many different types of functional arrangements that may be employed to implement the operation of the portion of the video fingerprinting application 411 as described herein. As an alternative, the flowchart of FIG. 7 may be viewed as depicting an example of steps of a method implemented in the computing device 401 according to one or more embodiments.

First, in box 701, can detect scene changes in a video as well as identify a time at which scene changes occur in the video in box 703. In box 705, time intervals between adjacent scene changes are determined. In box 707, a video profile that describes the time at which scene changes occur as well as the time interval between subsequent scene changes is generated. In box 709, the video fingerprinting application 411 identifies whether a reference video fingerprint matches the generated video profile. As noted above, some or all the functionality described pertaining to identification of a reference video fingerprint corresponding to a video may be performed in a client. Additionally, in some embodiments, a client device may record a video source with an integrated video camera and submit the video and/or scene change data from the video to a computing device executing the video fingerprinting application 411, which can determine if the video matches a reference video fingerprint. In other embodiments, the video fingerprinting application 411 can scan a corpus of videos and analyze scene change properties of the videos to identify potential matching reference video fingerprints in a database. It should be appreciated that many other variations applying the process of generating and matching a video fingerprint can be employed consistent with the present disclosure.

Figure 8:
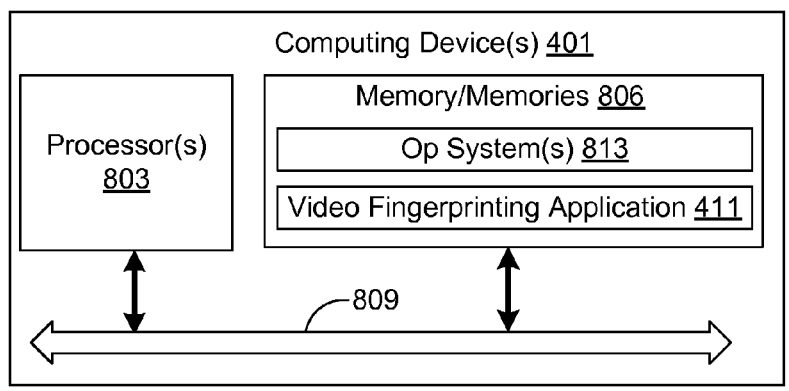
FIG. 8 is a schematic block diagram that provides one example illustration of a computing device employed in the computing environment of FIGS. 4-5 according to various embodiments of the present disclosure.

With reference to FIG. 8, shown is one example of a computing device 401 that comprises a computer server or equivalent device according to an embodiment of the present disclosure. The computing device 401 may include one or more processor circuits having a processor 803 and a memory 806, both of which are coupled to a local interface 809. In this respect, the local interface 809 may comprise, for example, a data bus with an accompanying control/address bus as can be appreciated.

Stored on the memory 806 and executable by the processor 803 are various components such as an operating system 813, video fingerprinting application 411, and other applications or data. In addition, it is understood that many other components may be stored in the memory 806 and executable by the processor(s) 803. Also, such components may reside in a memory that is external from the computing device 401 as can be appreciated.

As set forth above, a number of components are stored in the memory 806 and are executable by the processor 803. In this respect, the term "executable" refers to a program file that is in a form that can ultimately be run by the processor 803. Examples of executable programs may be, for example, a compiled program that can be translated into machine code in a format that can be loaded into a random access portion of the memory 806 and run by the processor 803, or source code that may be expressed in proper format such as object code that is capable of being loaded into a random access portion of the memory 806 and executed by the processor 803. An executable program may be stored in any portion or component of the memory 806 including, for example, random access memory, read-only memory, a hard drive, compact disk (CD), floppy disk, or other memory components.

The memory 806 is defined herein as both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 803 may represent multiple processors and the memory 806 may represent multiple memories that operate in parallel. In such a case, the local interface 809 may be an appropriate network that facilitates communication between any two of the multiple processors, between any processor and any one of the memories, or between any two of the memories, etc. The processor 803 may be of electrical, optical, or of some other construction as can be appreciated by those with ordinary skill in the art.

The operating system 813 is executed to control the allocation and usage of hardware resources such as the memory and processing time in the computing device 401. In this manner, the server operating system 813 serves as the foundation on which applications depend as is generally known by those with ordinary skill in the art.

Although the functionality of various components are described above with respect to FIGS. 1-7, such as, for example, the video fingerprinting application 411, as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowchart of FIGS. 6-7 show the functionality and operation of functionality implemented on the computing device 401. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system.

The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method, comprising:
    detecting, by at least one computing device, a plurality of scene changes in a video;
    identifying, by the at least one computing device, at least one time interval between at least two of the plurality of scene changes within the video;

generating, by the at least one computing device, a video fingerprint based at least upon the at least one time interval between at least two of the plurality of scene changes; and storing, by the at least one computing device, the video fingerprint in a data store in communication with the at least one computing device.

2. The method of claim 1, wherein generating the video fingerprint further comprises:

identifying, by the at least one computing device, a first scene change in the video;

identifying, by the at least one computing device, a second scene change subsequent to the first scene change;

determining, by the at least one computing device, a first time interval between the first scene change and the second scene change;

identifying, by the at least one computing device, a third scene change subsequent to the second scene change;

determining, by the at least one computing device, a second time interval between the second scene change and the third scene change;

generating, by the at least one computing device, a first fingerprint pairing comprising the first time interval and the second time interval; and incorporating, by the at least one computing device, the first fingerprint pairing into the video fingerprint.

3. The method of claim 2, further comprising:

identifying, by the at least one computing device, a fourth scene change subsequent to the third scene change; and determining, by the at least one computing device, a third time interval between the third scene change and the fourth scene change.

4. The method of claim 3, further comprising:

generating, by the at least one computing device, a second fingerprint pairing comprising the first time interval and a sum of the second time interval and the third time interval; and incorporating, by the at least one computing device, the second fingerprint pairing into the video fingerprint.

5. The method of claim 4, further comprising:

generating a third fingerprint pairing comprising the third time interval and a sum of the first time interval and the second time interval; and incorporating the third fingerprint pairing into the video fingerprint.

6. The method of claim 5, wherein the first fingerprint pairing, the second fingerprint pairing, and the third fingerprint pairing are associated with the first scene change in the video fingerprint.

7. The method of claim 5, wherein the video fingerprint further comprises a first scene change start time associated with the first scene change.

8. The method of claim 3, further comprising:

generating a fourth fingerprint pairing comprising the second time interval and the third time interval; and associating the fourth fingerprint pairing with the video fingerprint.

9. The method of claim 8, wherein the fourth fingerprint pairing is associated with the second scene change in the video fingerprint.

10. A system, comprising:

at least one computing device; and a video fingerprinting application executed in the at least one computing device, the video fingerprinting application being configured to:

detect a plurality of scene changes in a video;

identify a respective time at which individual ones of the plurality of scene changes occur in the video;

generate a video profile based at least upon the respective time at which the individual ones of the plurality of scene changes occur in the video; and determine whether the video profile matches a video fingerprint based at least upon the respective time at which the individual ones of the plurality of scene changes occur in the video.

11. The system of claim 10, wherein the video profile is further based at least upon a respective time difference between the individual ones of the plurality of scene changes.

12. The system of claim 10, wherein generating the video profile further comprises:

identifying a first scene change in the video;

identifying a second scene change subsequent to the first scene change;

determining a first time interval between the first scene change and the second scene change;

identifying a third scene change subsequent to the second scene change;

determining a second time interval between the second scene change and the third scene change;

generating a first pairing comprising the first time interval and the second time interval; and incorporating the first pairing into the video profile.

13. The system of claim 12, wherein generating the video profile further comprises:

identifying a fourth scene change subsequent to the third scene change;

determining a third time interval between the third scene change and the fourth scene change;

generating a second pairing comprising the first time interval and a sum of the second time interval and the third time interval; and incorporating the second pairing into the video profile.

14. The system of claim 13, wherein generating the video profile further comprises:

generating a third pairing comprising the third time interval and a sum of the first time interval and the second time interval; and incorporating the third pairing into the video profile.

15. The system of claim 14, wherein the first pairing, the second pairing, and the third pairing are associated with the first scene change in the video profile.

16. The system of claim 15, wherein the video profile further comprises a first scene change start time associated with the first scene change.

17. The system of claim 14, wherein the video fingerprint is based at least upon the time at which the scene changes occur in the video, and determining whether the video profile matches the video fingerprint further comprises determining whether the video fingerprint contains an entry corresponding to at least one of: the first pairing, the second pairing, or the third pairing.

18. A non-transitory computer-readable medium embodying a program executable in a computing device, the program configured to cause the computing device to:

detect a plurality of scene changes in a video;

identify at least one time interval between at least two of the plurality of scene changes within the video;

generate a video fingerprint based at least upon the at least one time interval between at least two of the plurality of scene changes; and store the video fingerprint in a data store in communication with the at least one computing device.

19. The non-transitory computer-readable medium of claim 18, wherein the video fingerprint is further based at least upon a respective time difference between individual ones of the plurality of scene changes.

20. The non-transitory computer-readable medium of claim 18, further configured to cause the computing device to:
generate a video profile of another video based at least upon at least one time interval between at least two of a respective plurality of scene changes of the other video; and
determine whether the video profile of the other video matches the video fingerprint based at least upon the video fingerprint and the video profile.

* * * * *